Nov. 6, 1923.
T. ELLIOTT
1,473,023
VEHICLE BODY
Filed June 28, 1921  3 Sheets-Sheet 1
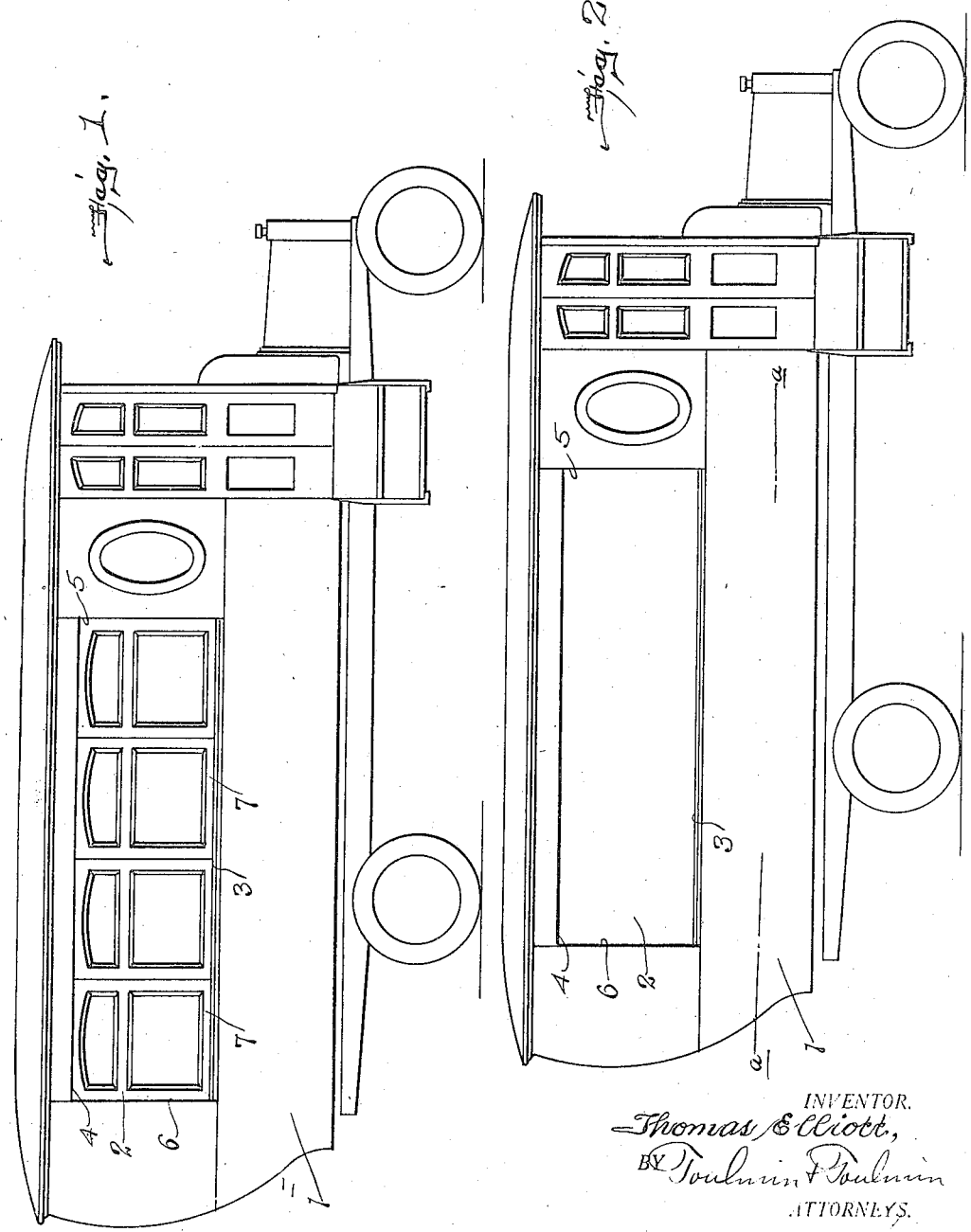
INVENTOR.
Thomas Elliott,
BY Toulmin & Toulmin
ATTORNEYS.

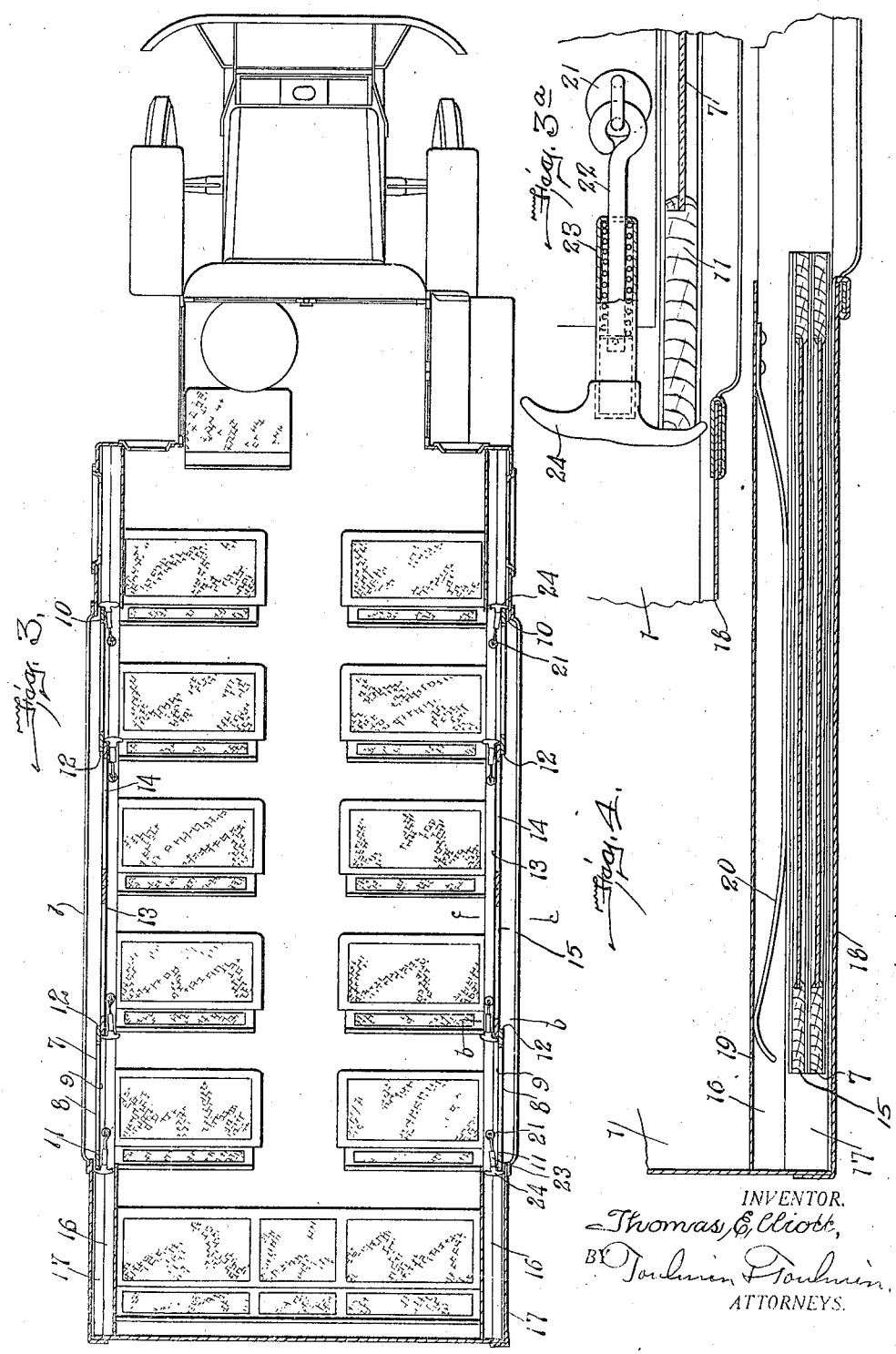

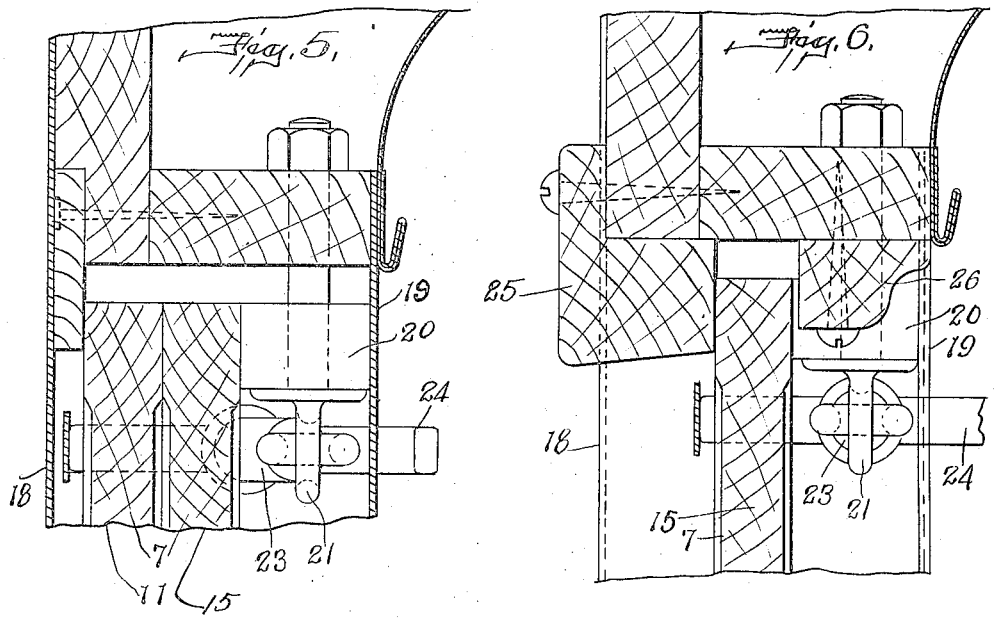
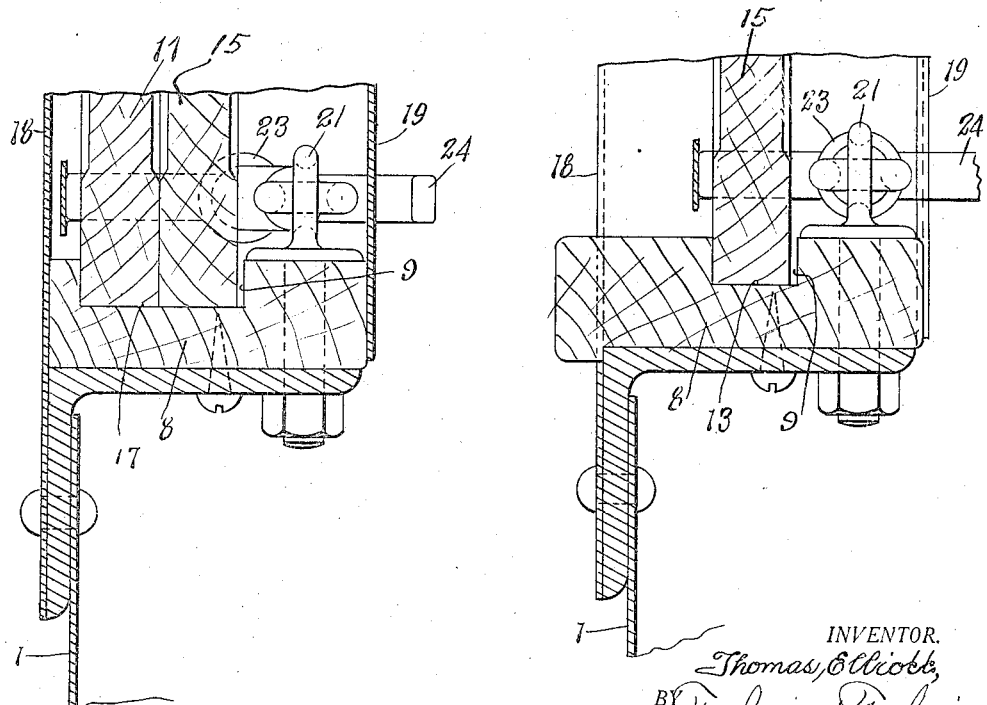

Patented Nov. 6, 1923.

1,473,023

UNITED STATES PATENT OFFICE.

THOMAS ELLIOTT, OF CINCINNATI, OHIO, ASSIGNOR TO THE CINCINNATI CAR COMPANY, OF CINCINNATI, OHIO, A CORPORATION OF OHIO.

VEHICLE BODY.

Application filed June 28, 1921. Serial No. 481,120.

*To all whom it may concern:*

Be it known that I, THOMAS ELLIOTT, a citizen of the United States, residing at Cincinnati, in the county of Hamilton and State of Ohio, have invented certain new and useful Improvements in Vehicle Bodies, of which the following is a specification, reference being had therein to the accompanying drawing.

This invention relates to vehicle bodies, particularly bodies for motor busses and electrical railway cars, more especially the former.

The general object which I have in view, and which this invention accomplishes, is the provision in such a vehicle body of an unobstructed space at each side, without the usual side posts, so that when the sashes are withdrawn the body will be converted from a sash-enclosed winter body to an open summer body; and also the provision at each end of the body of a pocket or enclosed space for the reception of the sashes when they are removed from their places along the sides of the body, some of the sashes being stored in one pocket and the others in the other pocket, together with the positioning of some of the sashes when closed in an overlapping position, one sash on another.

In my companion applications, Ser. No. 478,880, filed June 20, 1921, and Ser. No. 481,119, filed June 28, 1921, I have set forth what is here stated except as to the feature of the overlapping of the sashes, which latter feature changes the organization considered as an entirety.

The general purpose of this additional feature of the overlapping of the sashes is to insure a broader contact and therefore a tighter joint between the sashes. And this feature also requires a modification in the sash rest with respect to the sash ways or grooves therein, as will hereinafter appear.

In the accompanying drawings:

Fig. 1 is a side elevation of my improved body in the form adapted for a motor bus, with the sash in a closed position;

Fig. 2 is a like view showing the body with the sashes removed from closed position to leave the body open at the sides;

Fig. 3 is a partial plan and partial horizontal sectional view of the body with the sashes in closed position;

Fig. 3ª is a detail view of the spring retainer;

Fig. 4 is an enlarged sectional view on the line *a—a* of Fig. 2;

Fig. 5 is an enlarged vertical sectional view of one side of the body taken on the line *b—b* of Fig. 3;

Fig. 6 is a like view taken on the line *c—c* of Fig. 3.

In Figs. 1 and 2 I have shown, for the purposes of illustration, my improved vehicle body in a form adapted for use in a motor bus. But it will be understood that so far as concerns the general arrangement and type of the body it may be such as is applicable for use in street and interurban railway cars.

Therefore, it will be understood that the body designated generally by the numeral 1 may be of any of the usual or approved types of construction changed in the particulars now noted, namely, by the absence of side posts which occupy vertical positions along the sides of the body and divide off the space into a succession of window openings. These posts are eliminated under the terms of this invention. Instead the space indicated at 2 is continuous or undivided from the sill 3 to the crown 4 and from the forward end 5 to the rear end 6. This space is occupied by the sashes 7, as shown in Figs. 1 and 3.

The numeral 8 designates the sash rest located along the lower margin of the large opening 2 in the body. This rest is provided with grooves or ways 9, for the front and rear sashes 10 and 11. These grooves form shoulders 12 against which the sashes abut to prevent their further movement. The rest 8 also has a groove 13 for the sashes 14 and 15. This groove or way 13 is unshouldered and merges with the groove 9, which latter is wide enough for two sashes and extends on into the pockets where I have designated it 17, as will later appear.

The sashes 14 and 15 abut or come edge to edge while the sash 11 overlaps the sash 14 and the sash 10 overlaps the sash 15.

The rest 8 extends back into the space or pocket 16, one at each side of the general opening. Within the pocket the grooves 9 and 13 are merged into one wide groove 17 and adapted to accommodate a plurality of sashes placed side by side, as shown in Fig. 4. These pockets are formed between the outer wall or panel 18 and inner lining 19 of the vehicle body and readily receive and contain the sashes, some in one pocket and some in the other.

Springs in the form of long blades are located in the pockets to bear upon the sashes to hold them from working out of the pockets and against rattling. These springs are preferably fastened at one end to the body and left free at the other end with their intermediate portion bent to have contact with the sashes. These springs are designated 20 and are best seen in Fig. 4.

In order to maintain the sashes in closed position, with the forward and rear sashes 10 and 11 against the shoulders 12 and with these sashes overlapping those that are adjacent to them, respectively, as also to maintain the sashes 14 and 15 in edge contact, I provide a sash-retaining device, such as set forth and illustrated in detail in my said application, Ser. No. 478,880, filed June 20, 1921.

Generally speaking this device comprises an eye-bolt 21 anchored to the body structure and a rod 22 connected to the bolt and fitted in a sleeve 23, the latter having a head 24 adapted to be manipulated by the hand to cause it to engage and disengage the sash, a spiral spring being contained in the sleeve and adapted to act on the rod and sleeve in a manner to draw the head 24 against the sash. But any other form of device adapted to carry out this function may be used.

As seen in Fig. 3 I have applied one of these retaining devices for use with each of the sashes 10, 11, 14 and 15. The former keep the sashes 10 and 11 overlapped on the sashes 15 and 14, respectively, while the other two of these devices act on the sashes 14 and 15 to keep them in edge contact.

Referring to Fig. 5 the rest 8 and the double width groove 17 will be clearly seen, as also the spring 20 for holding the upper portions of the sashes in place while in the pockets.

In Fig. 6 the sash-rest 8 is shown at the point c—c in Fig. 3, with the sash 14 in the groove 13, at the bottom, while the upper part of this sash is shown between the outer molding 25 and the inner molding 26.

It will now be seen that in whichever of the two positions the sashes are placed they are properly held; that when in closed position they overlap at points intermediate the center and the extreme ends of the large side opening in the body; and that they are properly held in such overlapped position by the sash-retaining devices and the shoulders.

Having thus fully described my invention, what I claim as new and desire to secure by Letters Patent, is:—

1. A vehicle body having an open space in the side thereof and a pocket located adjacent to each end of said space, and a plurality of sashes adapted alternately to occupy said space and close it and to be slid into said pockets and occupy positions therein, side by side, in each pocket, some of said sashes overlapping each other when in closed position, and means to maintain said sashes in such overlapped position when closed and comprising spring pressed hook members mounted adjacent the path of the edges of the sashes nearer their respective pockets and engageable with said edges upon the sash being moved to closed position.

2. A vehicle body having an open space in the side thereof and a pocket located adjacent to each end of said space, and a plurality of sashes adapted alternately to occupy said space and close it and to be slid into said pockets and occupy positions therein, side by side, in each pocket, some of said sashes overlapping each other when in closed position, means to maintain said sashes in such overlapped position when closed and comprising spring pressed hook members mounted adjacent the path of the edges of the sashes nearer their respective pockets and engageable with said edges upon the sash being moved to closed position, and other means to prevent the sashes from rattling when in the pockets.

3. A vehicle body having an open space extended throughout the major portion of the length of the body and provided with sash ways at the top and bottom thereof and having a sash pocket contiguous with each end of said space, with sash guides therein contiguous with the guides in the space, and a plurality of sashes adapted alternately to occupy said space and close it and to occupy said pockets, some in each, some of said sashes overlapping others when in closed position, and spring retaining devices to maintain them in such overlapped relation and comprising spring pressed hook members mounted adjacent the path of the edges of the sashes nearer their respective pockets and engageable with said edges upon the sash being moved to closed position.

4. A vehicle body having in its side wall an unobstructed open space, a pocket at each side of said space, a sash-rest at the bottom of said space provided with a single sash groove or way in its middle portion and of double width in its outer portions, such rest and the double width portions of the groove extending into said pockets, the double width grooves having shoulders near the junction with the single width portion, and sashes adapted to occupy the single width groove in edge to edge position and other sashes to overlap them and occupy positions in the double width portions of the groove, and all of said sashes being adapted to slide into said pockets, respectively, and spring means engageable with and disengageable from the remote edges of the middle sashes and arranged to force said sashes toward each other when engaged.

In testimony whereof, I affix my signature.

THOMAS ELLIOTT.